(12) United States Patent
Shimizu et al.

(10) Patent No.: US 11,097,703 B2
(45) Date of Patent: Aug. 24, 2021

(54) ELECTRONIC CONTROL UNITS, VEHICLES, AND METHODS FOR CONTROLLING TRAILER BRAKE OUTPUT CIRCUITS BASED ON VEHICLE WHEEL ABS STATUSES

(71) Applicant: Toyota Motor Engineering & Manufacturing North America, Inc., Erlanger, KY (US)

(72) Inventors: Yuichi Shimizu, Ann Arbor, MI (US); Lisa DiMaggio, Ann Arbor, MI (US); Mikhal el Arculli, Celina, TX (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 568 days.

(21) Appl. No.: 15/672,472

(22) Filed: Aug. 9, 2017

(65) Prior Publication Data
US 2019/0039580 A1 Feb. 7, 2019

Related U.S. Application Data

(60) Provisional application No. 62/541,187, filed on Aug. 4, 2017.

(51) Int. Cl.
*B60T 8/17* (2006.01)
*B60T 8/172* (2006.01)
(Continued)

(52) U.S. Cl.
CPC .............. *B60T 8/172* (2013.01); *B60T 7/085* (2013.01); *B60T 8/1708* (2013.01); *B60T 17/22* (2013.01); *B60T 7/20* (2013.01); *B60T 8/323* (2013.01)

(58) Field of Classification Search
CPC .... B60T 8/1708; B60T 8/323; B60T 8/17554; B60T 8/1887; B60T 8/248; B60T 7/20;
(Continued)

(56) References Cited

U.S. PATENT DOCUMENTS 5,518,308 A  5/1996 Sugawara
5,642,280 A  6/1997 Negrin et al.
(Continued)

FOREIGN PATENT DOCUMENTS

CN   202593490 U   12/2012
WO   2017072271 A1   5/2017

*Primary Examiner* — Robert A. Siconolfi
*Assistant Examiner* — Stephen M Bowes
(74) *Attorney, Agent, or Firm* — Dinsmore & Shohl LLP

(57) ABSTRACT

Electronic control units, vehicles, and methods for controlling trailer brake output circuits based on vehicle wheel ABS statuses are disclosed. An electronic control unit for controlling a trailer brake output circuit based on vehicle wheel ABS statuses is configured to determine a first vehicle wheel ABS status, determine a second vehicle wheel ABS status, and control the trailer brake output circuit based on the first vehicle wheel ABS status and the second vehicle wheel ABS status. The first vehicle wheel ABS status is indicative of whether braking of a first vehicle wheel is being controlled in accordance with a vehicle ABS mode. The second vehicle wheel ABS status is indicative of whether braking of a second vehicle wheel is being controlled in accordance with the vehicle ABS mode.

15 Claims, 4 Drawing Sheets

(51) Int. Cl.
*B60T 17/22* (2006.01)
*B60T 7/08* (2006.01)
B60T 8/32 (2006.01)
B60T 7/20 (2006.01)

(58) Field of Classification Search
CPC ............. B60T 2230/03; B60T 2230/06; B60T 2270/0313
See application file for complete search history.

(56) References Cited

U.S. PATENT DOCUMENTS

| | | | |
|---|---|---|---|
| 5,644,490 A | 7/1997 | Weber | |
| 6,273,522 B1* | 8/2001 | Feetenby | B60T 7/20 188/112 R |
| 8,930,114 B1* | 1/2015 | Reid | B60T 8/323 280/204 |
| 9,333,955 B2 | 5/2016 | Stender et al. | |
| 2004/0026987 A1* | 2/2004 | Davis | B60T 7/08 303/3 |
| 2004/0119334 A1* | 6/2004 | Lenz | B60T 8/248 303/146 |
| 2008/0177454 A1* | 7/2008 | Bond | B60T 8/1708 701/70 |
| 2009/0204303 A1* | 8/2009 | Leschuk | B60T 7/12 701/71 |
| 2010/0292898 A1* | 11/2010 | Stoehr | B60C 23/009 701/48 |
| 2018/0126968 A1* | 5/2018 | Eckert | B60T 8/1708 |

* cited by examiner

ELECTRONIC CONTROL UNITS, VEHICLES, AND METHODS FOR CONTROLLING TRAILER BRAKE OUTPUT CIRCUITS BASED ON VEHICLE WHEEL ABS STATUSES

CROSS-REFERENCE TO RELATED APPLICATIONS

This application claims the benefit of U.S. Provisional Application No. 62/541,187, entitled "ELECTRONIC CONTROL UNITS, VEHICLES, AND METHODS FOR CONTROLLING TRAILER BRAKE OUTPUT CIRCUITS BASED ON VEHICLE WHEEL ABS STATUSES," filed Aug. 4, 2017, the entirety of which is hereby incorporated by reference.

TECHNICAL FIELD

The present specification generally relates to electronic control units, vehicles, and methods for controlling trailer brake output circuits and, more specifically, to electronic control units, vehicles, and methods for controlling trailer brake output circuits based on vehicle wheel ABS statuses.

BACKGROUND

Trailers (e.g., recreational trailers, utility trailers, boat trailers, semi-trailers, and the like) may be towed by towing vehicles (e.g., automobiles, such as trucks or the like). Some trailers include trailer brakes that may be actuated by a trailer brake controller coupled to the towing vehicle. The trailer brake controller may control the trailer brakes via an electric-over-hydraulic trailer braking system or an electric trailer braking system.

An electric-over-hydraulic trailer braking system includes hydraulic trailer brakes and an electric-over-hydraulic brake actuator coupled to the trailer that receives electrical signals from the trailer brake controller and facilitates the application of the hydraulic trailer brakes.

An electric trailer braking system includes electric trailer brakes that are applied when the trailer brake controller provides an electric current to the trailer brakes. The electric trailer brakes typically include brake shoes that frictionally engage a drum when activated. In some electric trailer braking system, an electromagnet is mounted on one end of a lever in order to actuate the brake shoes. When an electric current is applied to the electromagnet, the lever is pivoted as the electromagnet is drawn against the rotating brake drum, thereby actuating the electric trailer brakes.

SUMMARY

In one embodiment, an electronic control unit for controlling a trailer brake output circuit based on vehicle wheel ABS statuses is configured to determine a first vehicle wheel ABS status, determine a second vehicle wheel ABS status, and control the trailer brake output circuit based on the first vehicle wheel ABS status and the second vehicle wheel ABS status. The first vehicle wheel ABS status is indicative of whether braking of a first vehicle wheel is being controlled in accordance with a vehicle ABS mode. The second vehicle wheel ABS status is indicative of whether braking of a second vehicle wheel is being controlled in accordance with the vehicle ABS mode.

In another embodiment, a vehicle for controlling a trailer brake output circuit based on vehicle wheel ABS statuses includes a first vehicle wheel coupled to a first vehicle axle, a second vehicle wheel coupled to a second vehicle axle, the trailer brake output circuit, and an electronic control unit. The electronic control unit is configured to determine a first vehicle wheel ABS status, determine a second vehicle wheel ABS status, and control the trailer brake output circuit based on the first vehicle wheel ABS status and the second vehicle wheel ABS status. The first vehicle wheel ABS status is indicative of whether braking of the first vehicle wheel is being controlled in accordance with a vehicle ABS mode. The second vehicle wheel ABS status is indicative of whether braking of the second vehicle wheel is being controlled in accordance with the vehicle ABS mode.

In yet another embodiment, a method of controlling a trailer brake output circuit based on vehicle wheel ABS statuses includes determining a first vehicle wheel ABS status, determining a second vehicle wheel ABS status, and controlling the trailer brake output circuit based on the first vehicle wheel ABS status and the second vehicle wheel ABS status. The first vehicle wheel ABS status is indicative of whether braking of a first vehicle wheel is being controlled in accordance with a vehicle ABS mode. The second vehicle wheel ABS status is indicative of whether braking of a second vehicle wheel is being controlled in accordance with the vehicle ABS mode.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include electronic control units, vehicles, and methods for controlling trailer brake output circuits based on vehicle wheel ABS statuses. Referring generally to the figures, an electronic control unit for controlling a trailer brake output circuit based on vehicle wheel ABS statuses is configured to determine a first vehicle wheel ABS status, determine a second vehicle wheel ABS status, and control the trailer brake output circuit based on the first vehicle wheel ABS status and the second vehicle wheel ABS status. The first vehicle wheel ABS status is indicative of whether braking of a first vehicle wheel is being controlled in accordance with a vehicle ABS mode. The second vehicle wheel ABS status is indicative of whether braking of a second vehicle wheel is being controlled in accordance with the vehicle ABS mode. In some embodiments, by controlling the trailer brake output circuit based on vehicle wheel ABS statuses, trailer brakes may be controlled in accordance with vehicle brakes to maintain stability of the vehicle and trailer and facilitate desirable stopping performance while a towing vehicle wheel is braked in accordance with a vehicle ABS mode. In some embodiments, by controlling the trailer brake output circuit based on vehicle wheel ABS statuses, the trailer brakes may be applied in a manner that avoids erroneously activating the trailer brakes in a trailer brake control ABS mode in situations where it is inappropriate, thereby preventing unintended acceleration loss. The various electronic control units, vehicles, and methods for controlling trailer brake output circuits based on vehicle wheel ABS statuses will be described in more detail herein with specific reference to the corresponding drawings.

Figure 1:
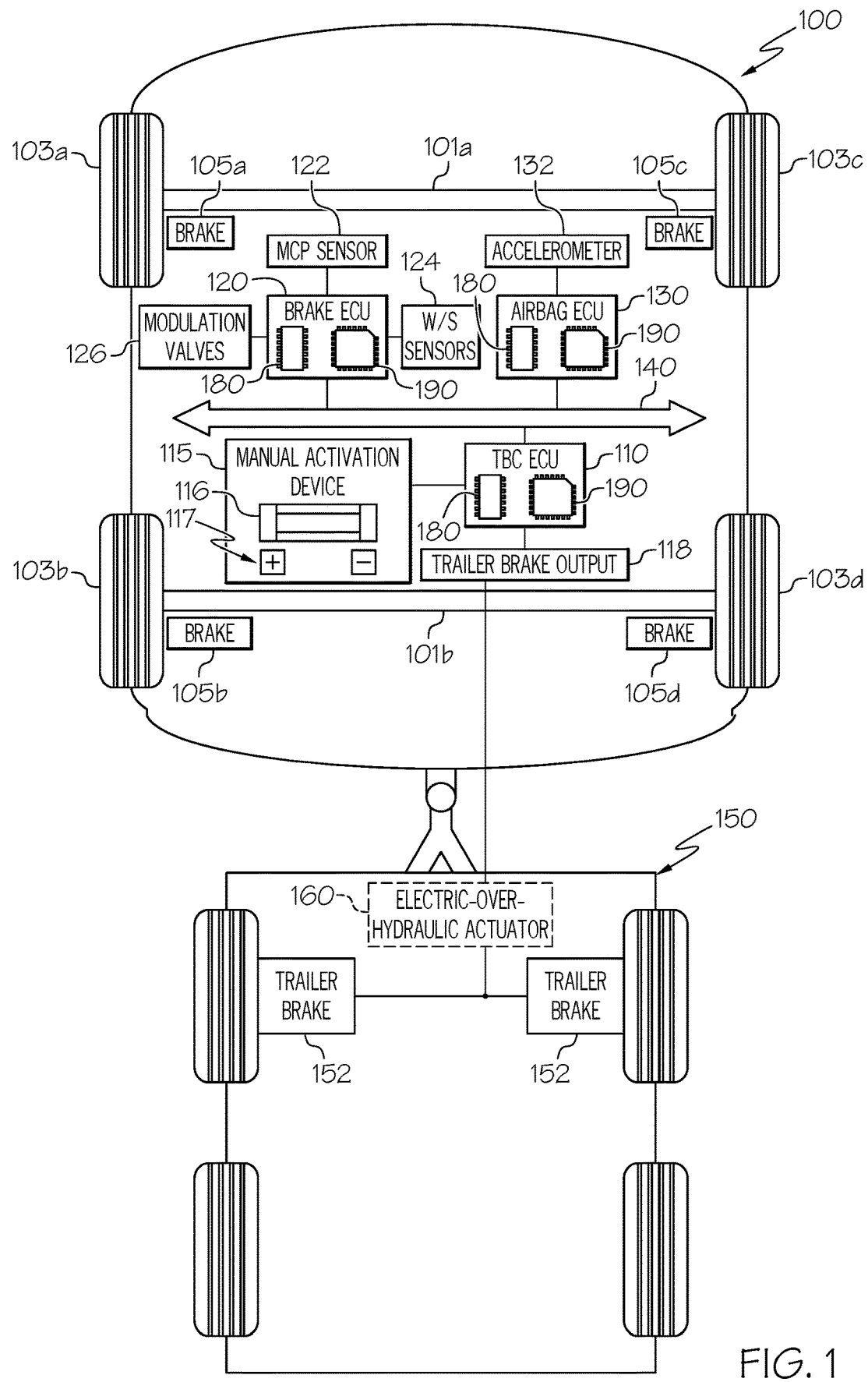
FIG. 1 schematically depicts a vehicle and trailer, according to one or more embodiments shown and described herein.

Referring now to FIG. 1, one embodiment of a towing vehicle 100 coupled to and operable to tow a trailer 150 is schematically depicted. The trailer 150 may be any unpowered vehicle including one or more wheels capable of being towed by the towing vehicle 100. By way of non-limiting example, the trailer 150 may be a recreational trailer, a utility trailer, a boat trailer, a semi-trailer, or the like. The trailer 150 includes a plurality of trailer brakes 152. As depicted in FIG. 1, the trailer 150 includes two trailer brakes 152, one coupled to each wheel of the front axle. However, it should be understood that in other embodiments, the trailer 150 may include more than or less than two trailer brakes 152, such as in embodiments in which the trailer 150 includes multiple axles with one or more trailer brakes 152 associated with each axle. In some embodiments, such as embodiments in which the trailer 150 includes an electric trailer braking system, the plurality of trailer brakes 152 are a plurality of electric trailer brakes that are electrically coupled to the electrical system of the towing vehicle 100. In some embodiments, such as embodiments in which the trailer 150 includes an electric-over-hydraulic trailer braking system, the trailer 150 includes an electric-over-hydraulic actuator 154 and a plurality of hydraulic trailer brakes. The electric-over-hydraulic actuator 154 transforms an electrical signal received from the towing vehicle 100 into a hydraulic signal used to activate the plurality of trailer brakes 152.

Still referring to FIG. 1, the towing vehicle 100 may be an automobile or any other passenger or non-passenger vehicle such as, for example, a tractor or a tractor truck. The towing vehicle 100 includes a first vehicle axle 101a, a second vehicle axle 101b, a first vehicle wheel 103a, a second vehicle wheel 103b, a third vehicle wheel 103c, a fourth vehicle wheel 103d, a first vehicle brake 105a, a second vehicle brake 105b, a third vehicle brake 105c, a fourth vehicle brake 105d, a manual trailer brake activation device 115, a trailer brake control electronic control unit ("trailer brake control ECU") 110, a trailer brake output circuit 118, a brake electronic control unit ("brake ECU") 120, a master cylinder pressure sensor ("MCP sensor") 122, a plurality of wheel speed sensors 124, a plurality of modulation valves 126, an airbag electronic control unit ("airbag ECU") 130, an accelerometer 132, and a communication path 140. The various components of the towing vehicle 100 and the interaction thereof will be described in detail below.

Still referring to FIG. 1, the first vehicle wheel 103a and the third vehicle wheel 103c are coupled to the first vehicle axle 101a. The second vehicle wheel 103b and the fourth vehicle wheel 103d are coupled to the second vehicle axle 101b. The first vehicle brake 105a controls braking of the first vehicle wheel 103a. In some embodiments, braking of the first vehicle wheel 103a by the first vehicle brake 105a is controlled by the brake ECU 120. The second vehicle brake 105b controls braking of the second vehicle wheel 103b. In some embodiments, braking of the second vehicle wheel 103b by the second vehicle brake 105b is controlled by the brake ECU 120. The third vehicle brake 105c controls braking of the third vehicle wheel 103c. In some embodiments, braking of the third vehicle wheel 103c by the third vehicle brake 105c is controlled by the brake ECU 120. The fourth vehicle brake 105d controls braking of the fourth vehicle wheel 103d. In some embodiments, braking of the fourth vehicle wheel 103d by the fourth vehicle brake 105d is controlled by the brake ECU 120.

Still referring to FIG. 1, the trailer brake control ECU 110 is communicatively coupled to the communication path 140, to the manual trailer brake activation device 115, and to the trailer brake output circuit 118. The trailer brake control ECU 110 is configured to control the trailer brake output circuit 118 based on one or more inputs received via the communication path 140 (e.g., based on a master cylinder pressure determined by the brake ECU 120 based on an output of the MCP sensor 122 and transmitted to the trailer brake control ECU 110 by the brake ECU 120, based on a vehicle acceleration message determined by the airbag ECU 130 based on an output signal of the accelerometer 132 and transmitted by the airbag ECU to the trailer brake control ECU 110, based on a vehicle brake light circuit signal, or the like), and/or from the manual trailer brake activation device 115 (e.g., based on a position of a slider 116 of the manual trailer brake activation device 115 and/or activation of one or more of the gain pushbuttons 117 of the manual trailer brake activation device 115).

Still referring to FIG. 1, the manual trailer brake activation device 115 includes a slider 116 and gain pushbuttons 117. The manual trailer brake activation device 115 is configured to output a signal including a position of the slider 116 and activation of the gain pushbuttons 117. In some embodiments, the output signal of the manual trailer brake activation device 115 is received by the trailer brake control ECU 110, which may generate a trailer brake output signal with the trailer brake output circuit 118 based on the position of the slider 116 and/or a system gain determined based on activation of the gain pushbuttons 117.

Still referring to FIG. 1, the trailer brake output circuit 118 is communicatively coupled to the trailer brake control ECU 110. The trailer brake output circuit 118 is electrically coupled to one or more components of the trailer 150 by a conductive medium, such as a conductive wire. In some embodiments, such as embodiments in which the trailer 150 includes an electric trailer braking system, the trailer brake output circuit 118 is electrically coupled to the plurality of trailer brakes 152. In some embodiments, such as embodiments in which the trailer 150 includes an electric-over-hydraulic trailer braking system comprising an electric-over-hydraulic actuator 154 and a plurality of hydraulic trailer brakes 152, the trailer brake output circuit 118 is electrically coupled to the electric-over-hydraulic actuator 154. The trailer brake output circuit 118 is controlled by the trailer brake control ECU and supplies an electrical trailer brake output signal to the plurality of trailer brakes 152 (e.g., in embodiments in which the trailer 150 includes an electric trailer braking system) or to the electric-over-hydraulic actuator 154 (e.g., in embodiments in which the trailer 150 includes an electric-over-hydraulic trailer braking system) via the conductive medium when commanded by the trailer brake control ECU 110. In some embodiments, the trailer brake output circuit 118 may supply current from the power system of the towing vehicle 100. The trailer brake output circuit 118 generally includes one or more electrical components, such as resistors, capacitors, transistors, inductors, and the like. In some embodiments, the trailer brake output circuit 118 may include at least one power transistor, such as a MOSFET transistor.

Still referring to FIG. 1, the brake ECU 120 is communicatively coupled to the communication path 140, to the MCP sensor 122, to the plurality of wheel speed sensors 124, and to the plurality of modulation valves 126. The brake ECU 120 is configured to control activation of the vehicle brakes (e.g., the first vehicle brake 105a, the second vehicle brake 105b, the third vehicle brake 105c, and the fourth vehicle brake 105d). The brake ECU is configured to determine a master cylinder pressure based on an output signal of the MCP sensor 122 and to transmit the master cylinder pressure to other components of the towing vehicle 100 via the communication path 140, such as to the trailer brake control ECU 110 to be used by the trailer brake control ECU 110 to generate a trailer brake output signal based on the master cylinder pressure as described herein.

Still referring to FIG. 1, the brake ECU 120 may control braking of a vehicle wheel in accordance with a vehicle ABS mode (e.g., by adjusting the application of the brake of the vehicle wheel with at least one modulation valve of the plurality of modulation valves 126 in accordance to prevent wheel lock-up). In some embodiments, the brake ECU may control braking of the vehicle wheel in accordance with the vehicle ABS mode in response to processing an output signal of a wheel speed sensor of the plurality of wheel speed sensors 124 that corresponds to the vehicle wheel and determining that braking of the vehicle wheel should be controlled in accordance with the vehicle ABS mode based on the output signal of the wheel speed sensor (e.g., in response to determining that the wheel speed of the vehicle wheel varies greatly from the wheel speeds of the other vehicle wheels).

Still referring to FIG. 1, in some embodiments, the brake ECU 120 may determine a vehicle wheel ABS status for each of the vehicle wheels. The vehicle wheel ABS status is indicative of whether braking of the vehicle wheel is being controlled in accordance with a vehicle ABS mode. In some embodiments, the brake ECU 120 may determine a first vehicle wheel ABS status indicative of whether braking of the first vehicle wheel 103a is being controlled in accordance with the vehicle ABS mode (e.g., by determining that the first vehicle wheel ABS status is active when braking of the first vehicle wheel 103a is being controlled in accordance with the vehicle ABS mode and determining that the first vehicle wheel ABS status is inactive when braking of the first vehicle wheel 103a is not being controlled in accordance with the vehicle ABS mode). In some embodiments, the brake ECU 120 may determine a second vehicle wheel ABS status indicative of whether braking of the second vehicle wheel 103b is being controlled in accordance with the vehicle ABS mode (e.g., by determining that the second vehicle wheel ABS status is active when braking of the second vehicle wheel 103b is being controlled in accordance with the vehicle ABS mode and determining that the second vehicle wheel ABS status is inactive when braking of the second vehicle wheel 103b is not being controlled in accordance with the vehicle ABS mode). In some embodiments, the brake ECU 120 may determine a third vehicle wheel ABS status indicative of whether braking of the third vehicle wheel 103c is being controlled in accordance with the vehicle ABS mode (e.g., by determining that the third vehicle wheel ABS status is active when braking of the third vehicle wheel 103c is being controlled in accordance with the vehicle ABS mode and determining that the third vehicle wheel ABS status is inactive when braking of the third vehicle wheel 103c is not being controlled in accordance with the vehicle ABS mode). In some embodiments, the brake ECU 120 may determine a fourth vehicle wheel ABS status indicative of whether braking of the fourth vehicle wheel 103d is being controlled in accordance with the vehicle ABS mode (e.g., by determining that the fourth vehicle wheel ABS status is active when braking of the fourth vehicle wheel 103d is being controlled in accordance with the vehicle ABS mode and determining that the fourth vehicle wheel ABS status is inactive when braking of the fourth vehicle wheel 103d is not being controlled in accordance with the vehicle ABS mode). In some embodiments, the brake ECU 120 transmits the vehicle wheel ABS status of each of the vehicle wheels (e.g., the first vehicle wheel ABS status, the second vehicle wheel ABS status, the third vehicle wheel ABS status, and the fourth vehicle wheel ABS status) via the communication path 140 (e.g., to the trailer brake control ECU 110, which is configured to control the trailer brake output circuit 118 based on the vehicle wheel ABS statuses as described in further detail herein).

Still referring to FIG. 1, the airbag ECU 130 is communicatively coupled to the communication path 140 and to the accelerometer 132. The airbag ECU 130 is configured to control activation of the airbag and to transmit a vehicle acceleration message to other components of the towing vehicle 100 via the communication path 140. The accelerometer 132 is a device configured to generate an output signal proportional to vehicle acceleration or deceleration. The airbag ECU 130 determines the vehicle acceleration message to transmit to the communication path 140 based on the output signal of the accelerometer 132. In some embodiments, zero point logic may be employed to the accelerometer value to decrease variability in the sensor value, such as by determining an accelerometer value when a driver is judged to begin braking (e.g., based on master cylinder pressure), and then determining future accelerometer values relative to the accelerometer value when the driver began braking.

Still referring to FIG. 1, the communication path 140 may be formed from any medium that is capable of transmitting a signal such as, for example, conductive wires, conductive traces, optical waveguides, or the like. Moreover, the communication path 140 may be formed from a combination of mediums capable of transmitting signals. In one embodiment, the communication path 140 comprises a combination of conductive traces, conductive wires, connectors, and buses that cooperate to permit the transmission of electrical data signals to components such as processors, memories, sensors, input devices, output devices, and communication devices. Accordingly, the communication path 140 may comprise a towing vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 140 communicatively couples the various components of the towing vehicle 100. As used herein, the term "communicatively coupled" means that coupled components are capable of exchanging data signals with one another such as, for example, electrical signals via conductive medium, electromagnetic signals via air, optical signals via optical waveguides, and the like.

Still referring to FIG. 1, each of the trailer brake control ECU 110, the brake ECU 120, and the airbag ECU 130 comprises one or more processors 180 and one or more memory modules 190. While the trailer brake control ECU 110, the brake ECU 120 and the airbag ecu 130 are configured to perform specific processing steps as described herein, in other embodiments, the processing steps may be performed by any combination of the trailer brake control ECU 110, the brake ECU 120, the airbag ecu 130, and any other vehicle ECU.

Still referring to FIG. 1, each of the one or more processors 180 may be any device capable of executing machine readable instructions. Accordingly, each of the one or more processors 180 may be a controller, an integrated circuit, a microchip, a computer, or any other computing device. Each of the one or more processors 180 is communicatively coupled to the other components of the towing vehicle 100 by the communication path 140. Accordingly, the communication path 140 may communicatively couple any number of processors with one another, and allow the components coupled to the communication path 140 to operate in a distributed computing environment. Specifically, each of the components may operate as a node that may send and/or receive data.

Still referring to FIG. 1, each of the one or more memory modules 190 is coupled to the communication path 140 and communicatively coupled to the one or more processors 180. The one or more memory modules 190 may comprise RAM, ROM, flash memories, hard drives, or any device capable of storing machine readable instructions such that the machine readable instructions can be accessed and executed by the one or more processors 180. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 190. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 1, the one or more memory modules 190 may include one or more trailer brake control parameters. The trailer brake control parameters may include any parameter or variable that influences the electrical signal output by the trailer brake output circuit 118. For example, the trailer brake control parameters may include a system gain. The system gain may define a relationship between a trailer brake activation signal (e.g., a vehicle deceleration, a master cylinder pressure, or a position of the slider 116) and the trailer brake output signal provided to the trailer 150 by the trailer brake output circuit 118. In some embodiments, the system gain is adjusted in response to activation of the gain pushbuttons 117. In some embodiments, the system gain is automatically determined and/or adjusted by the trailer brake control ECU 110. In some embodiments, the trailer brake output signal is a function of a trailer brake activation signal (e.g., a vehicle deceleration, a master cylinder pressure, or a position of the slider 116) scaled by the system gain.

Figure 2:
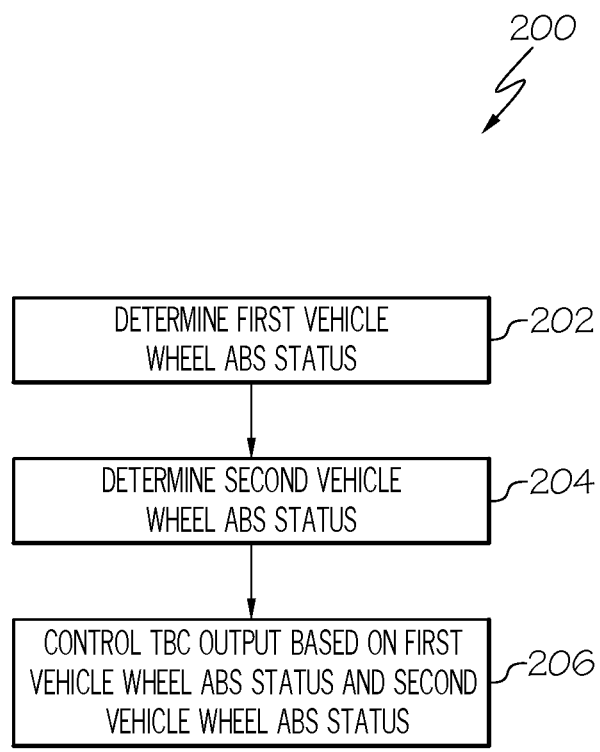
FIG. 2 schematically depicts a flowchart of a method for controlling a trailer brake output circuit based on vehicle wheel ABS statuses, according to one or more embodiments shown and described herein.

FIG. 2 schematically depicts a flowchart of a method 200 for controlling the trailer brake output circuit 118 based on vehicle wheel ABS statuses. Referring now to FIGS. 1 and 2, at block 202, a first vehicle wheel ABS status is determined. The first vehicle wheel ABS status is indicative of whether braking of a first vehicle wheel is being controlled in accordance with a vehicle ABS mode. In some embodiments, the trailer brake control ECU 110 is configured to determine the first vehicle wheel ABS status at block 202. In some embodiments, the trailer brake control ECU 110 is configured to determine the first vehicle wheel ABS status based on a vehicle wheel ABS status of the first vehicle wheel that is received from the brake ECU 120 via the communication path 140. For example, in some embodiments, the trailer brake control ECU 110 is configured to determine that the first vehicle wheel ABS status is the vehicle wheel ABS status of the first vehicle wheel received from the brake ECU 120. For example, some embodiments may determine the vehicle wheel ABS status of the first vehicle wheel 103a, which is coupled to the first vehicle axle 101a.

Still referring to FIGS. 1 and 2, at block 204, a second vehicle wheel ABS status is determined. The second vehicle wheel ABS status is indicative of whether braking of a second vehicle wheel is being controlled in accordance with a vehicle ABS mode. In some embodiments, the trailer brake control ECU 110 is configured to determine the second vehicle wheel ABS status at block 204. In some embodiments, the trailer brake control ECU 110 is configured to determine the second vehicle wheel ABS status based on a vehicle wheel ABS status of the second vehicle wheel that is received from the brake ECU 120 via the communication path 140. For example, in some embodiments, the trailer brake control ECU 110 is configured to determine that the second vehicle wheel ABS status is the vehicle wheel ABS status of the second vehicle wheel received from the brake ECU 120. For example, some embodiments may determine the vehicle wheel ABS status of the second vehicle wheel 103b, which is coupled to the second vehicle axle 101b.

In addition to determining the first vehicle wheel ABS status and the second vehicle wheel ABS status, some embodiments may determine vehicle wheel ABS status of all four vehicle wheels.

Still referring to FIGS. 1 and 2, at block 206, the trailer brake output circuit 118 is controlled based on the first vehicle wheel ABS status determined at block 202 and the second vehicle wheel ABS status determined at block 204. In some embodiments, the trailer brake control ECU 110 is configured to control the trailer brake output circuit 118 based on the first vehicle wheel ABS status and the second vehicle wheel ABS status. In some embodiments, the trailer brake control ECU 110 is configured to control the trailer brake output circuit 118 based on only one vehicle wheel ABS status (e.g., by controlling the trailer brake output circuit 118 in accordance with a trailer brake control ABS mode based on only one of the first vehicle wheel ABS status and the second vehicle wheel ABS status) or based on more than two vehicle wheel ABS status (e.g., by controlling the trailer brake output circuit 118 in accordance with a trailer brake control ABS mode based on the vehicle wheel ABS statuses of all four of the vehicle wheels). In some embodiments, the trailer brake control ECU 110 is configured to control the trailer brake output circuit 118 in accordance with a trailer brake control ABS mode (e.g., in accordance with the trailer brake control ABS mode depicted in FIG. 5) in response to determining that the first vehicle wheel ABS status is active and the second vehicle wheel ABS status is active. In some embodiments, the trailer brake control ECU 110 is configured to control the trailer brake output circuit 118 in accordance with a trailer brake control ABS mode (e.g., in accordance with the trailer brake control ABS mode depicted in FIG. 5) in response to determining that at least one of the first vehicle wheel ABS status is active and the second vehicle wheel ABS status is active. In some embodiments, the trailer brake control ECU 110 is configured to control the trailer brake output circuit 118 in accordance with a trailer brake control ABS mode (e.g., in accordance with the trailer brake control ABS mode depicted in FIG. 5) in response to determining that vehicle wheel ABS statuses of both vehicle wheels coupled to a single vehicle axle are active (e.g., when vehicle wheel ABS status of the first vehicle wheel 103*a* is active and the vehicle wheel ABS status of the third vehicle wheel 103*c* is active).

Figure 5:
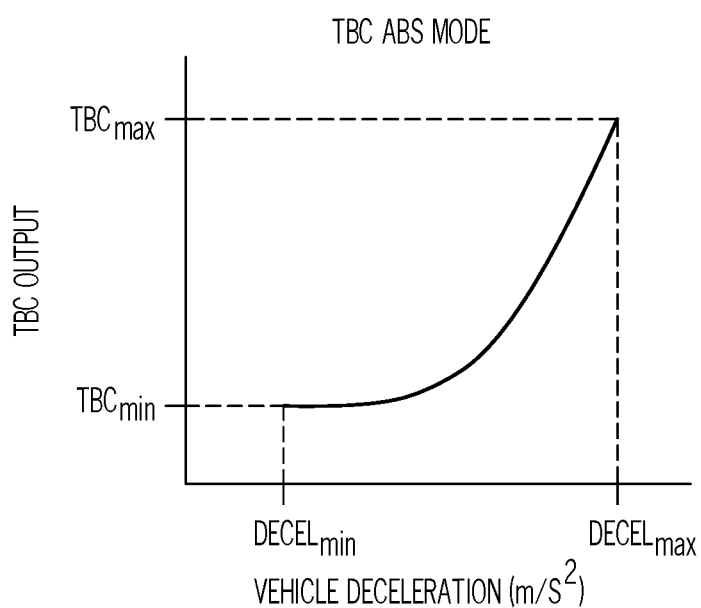
FIG. 5 schematically depicts a trailer brake output curve in which trailer brake output is calculated as a function of vehicle deceleration in a trailer brake control ABS mode.

In some embodiments, the trailer brake control ECU 110 is configured to determine that a first vehicle axle ABS status is active in response to determining that the first vehicle wheel ABS status is active. The first vehicle axle ABS status is indicative of whether braking of at least one vehicle wheel coupled to the first vehicle axle is being controlled in accordance with the vehicle ABS mode. For example, in some embodiments, the trailer brake control ECU 110 is configured to determine that the ABS status of the first vehicle axle 101*a* is active in response to determining that the ABS status of the first vehicle wheel 103*a* is active. The trailer brake control ECU 110 is further configured to determine that a second vehicle axle ABS status is active in response to determining that the second vehicle wheel ABS status is active. The second vehicle axle ABS status is indicative of whether braking of at least one vehicle wheel coupled to the second vehicle axle is being controlled in accordance with the vehicle ABS mode. For example, in some embodiments, the trailer brake control ECU 110 is configured to determine that the ABS status of the second vehicle axle 101*b* is active in response to determining that the ABS status of the second vehicle wheel 103*b* is active. The trailer brake control ECU 110 is configured to control the trailer brake output circuit based on the first vehicle axle ABS status and the second vehicle axle ABS status. In some embodiments, the trailer brake control ECU 110 is configured to control the trailer brake output circuit 118 in accordance with a trailer brake control ABS mode (e.g., as shown in FIG. 5) in response to determining that the first vehicle axle ABS status is active and the second vehicle axle ABS status is active. In some embodiments, the trailer brake control ECU 110 is configured to, when the first vehicle axle ABS status is active and the second vehicle axle ABS status is inactive, control the trailer brake output circuit in accordance with a trailer brake control ABS mode (e.g., as shown in FIG. 5) in response to determining that the first vehicle axle ABS status remains active for a duration of time. In some embodiments, the duration of time is determined based on a vehicle speed, which may be determined by the trailer brake control ECU 110 based on a vehicle speed message received at the trailer brake control ECU 110 from the communication path 140.

Figure 4:
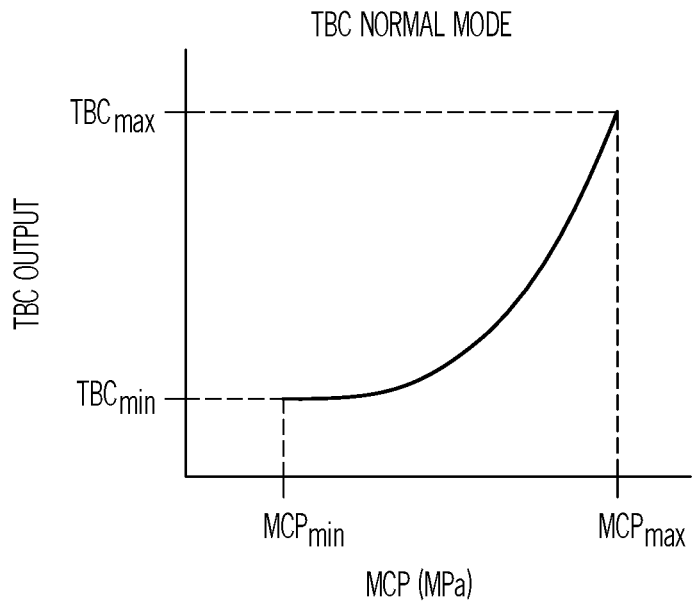
FIG. 4 schematically depicts a trailer brake output curve in which trailer brake output is calculated as a function of master cylinder pressure in a trailer brake control normal mode, according to one or more embodiments shown and described herein.

In some embodiments, the trailer brake control ECU 110 is configured to determine whether to control the trailer brake output circuit 118 in accordance with a trailer brake control ABS mode (e.g., as shown in FIG. 5) or to control the trailer brake output circuit 118 in accordance with a trailer brake control normal mode (e.g., as shown in FIG. 4) based on the first vehicle wheel ABS status and the second vehicle wheel ABS status. For example, in some embodiments, the trailer brake control ECU 110 is configured to control the trailer brake output circuit 118 in accordance with a trailer brake control ABS mode when the ABS status of the first vehicle wheel 103*a* is active and the ABS status of the second vehicle wheel 103*b* is active, and to control the trailer brake output circuit 118 in accordance with a trailer brake control normal mode when the ABS status of the first vehicle wheel 103*a* is inactive and the ABS status of the second vehicle wheel 103*b* is inactive.

Figure 3:
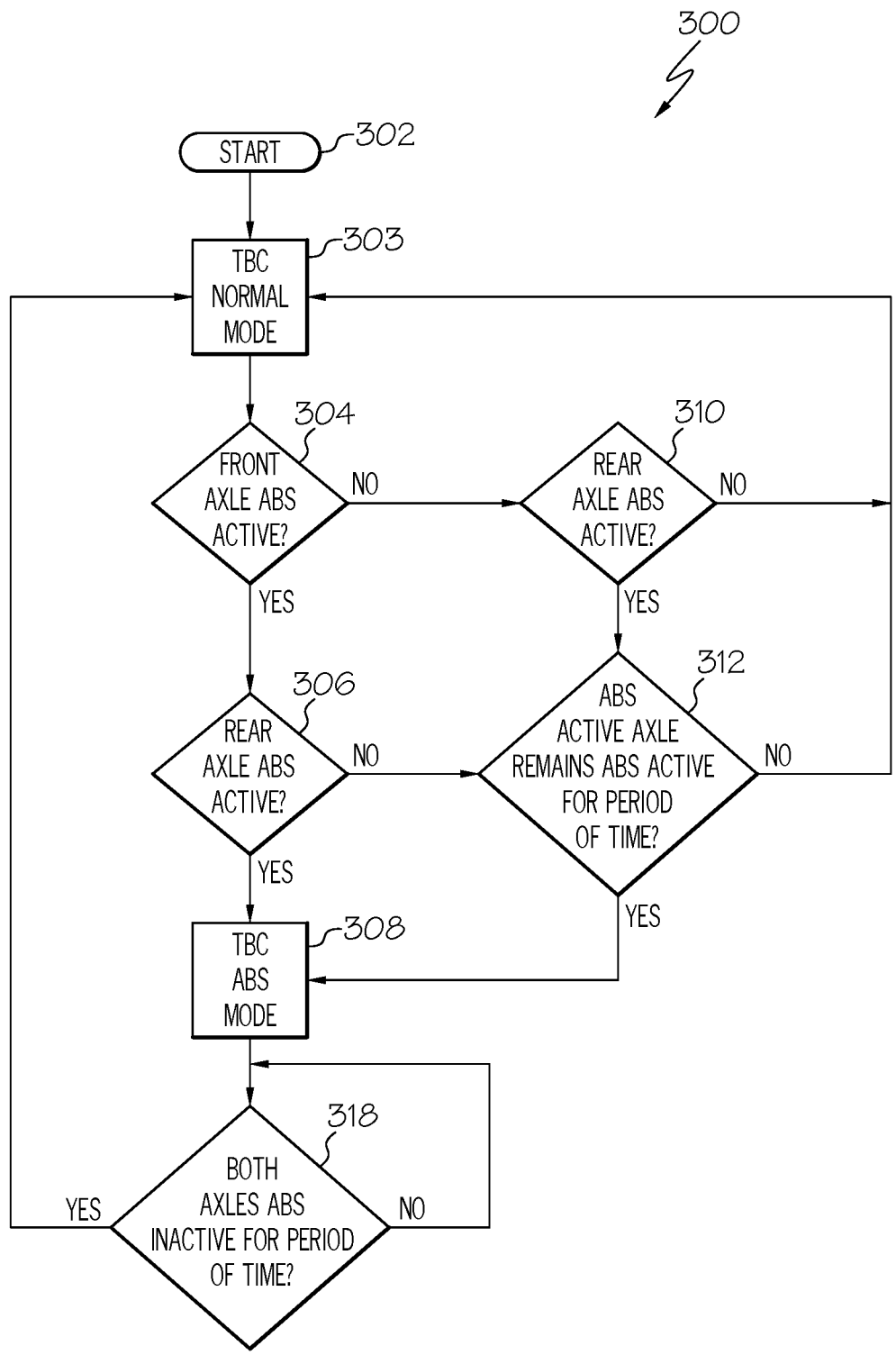
FIG. 3 schematically depicts a flowchart of a method for controlling a trailer brake output circuit based on vehicle wheel ABS statuses, according to one or more embodiments shown and described herein.

Referring now to FIG. 3, a flowchart of a method 300 for controlling a trailer brake output circuit 118 based on vehicle wheel ABS statuses is depicted. Referring now to FIGS. 1 and 3, at block 302, the method 300 starts. At block 303, the trailer brake control ECU 110 is configured to control the trailer brake output circuit 118 in accordance with a trailer brake control normal mode (e.g., as shown in FIG. 4 where the trailer brake control ECU 110 is configured to control the trailer brake output circuit 118 to output a trailer brake output signal based on master cylinder pressure).

At block 304, the trailer brake control ECU is configured to determine if a front axle ABS status is active. The front axle ABS status is indicative of whether braking of at least one vehicle wheel (e.g., the first vehicle wheel 103*a* or the third vehicle wheel 103*c*) coupled to the front axle (e.g., the first vehicle axle 101*a*) is being controlled in accordance with a vehicle ABS mode. In some embodiments, the front axle ABS status is determined to be active in response to determining that the ABS status of the first vehicle wheel 103*a* is active (which may be determined based on an ABS status of the first vehicle wheel 103*a* received at the trailer brake control ECU 110 as described above). In some embodiments, the front axle ABS status is determined to be active in response to determining that the ABS status of the third vehicle wheel 103*c* is active (which may be determined based on an ABS status of the third vehicle wheel 103*c* received at the trailer brake control ECU 110 as described above).

If the front axle ABS status is determined active at block 304 (yes at block 304), the method 300 proceeds to block 306, where the trailer brake control ECU 110 is configured to determine if a rear axle ABS status is active. The rear axle ABS status is indicative of whether braking of at least one vehicle wheel (e.g., the second vehicle wheel 103*b* or the fourth vehicle wheel 103*d*) coupled to the rear axle (e.g., the second vehicle axle 101*b*) is being controlled in accordance with a vehicle ABS mode. In some embodiments, the rear axle ABS status is determined to be active in response to determining that the ABS status of the second vehicle wheel 103*b* is active (which may be determined based on an ABS status of the second vehicle wheel 103*b* received at the trailer brake control ECU 110 as described above). In some embodiments, the rear axle ABS status is determined to be active in response to determining that the ABS status of the fourth vehicle wheel 103*d* is active (which may be determined based on an ABS status of the fourth vehicle wheel 103*d* received at the trailer brake control ECU 110 as described above).

If the rear axle ABS status is also determined to be active at block 306 (yes at block 306), the method 300 proceeds to block 308, where the trailer brake control ECU 110 is configured to control the trailer brake output circuit 118 in accordance with a trailer brake control ABS mode (e.g., as shown in FIG. 5 where the trailer brake control ECU 110 is configured to control the trailer brake output circuit 118 to output a trailer brake output signal based on vehicle deceleration). Thus, at block 308, the trailer brake control ECU 110 controls the trailer brake output circuit 118 in response to determining that the first vehicle axle ABS status is active and the second vehicle axle ABS status is active. By controlling the trailer brake output circuit 118 in accordance with a trailer brake control ABS mode when both the rear axle ABS status and the front axle ABS status are active, the trailer brake output circuit 118 may be controlled in accordance with a trailer brake control ABS mode in conditions where it is appropriate to quickly do so (e.g., in a split mu situation or where all four wheels are ABS active).

At block 318, the trailer brake control ECU 110 is configured to determine whether both the front axle ABS status and the rear axle ABS status are inactive for a period of time (which in some embodiments is determined based on vehicle speed). If both the front axle ABS status and the rear axle ABS status are inactive for a period of time (yes at block 318), the method returns to block 303, where the trailer brake control ECU 110 is configured to control the trailer brake output circuit 118 in accordance with a trailer brake control normal mode (e.g., as shown in FIG. 4), thereby exiting the trailer brake control ABS mode. If both the front axle ABS status and the rear axle ABS status are not inactive for a period of time (no at block 318), such as because at least one of the front axle ABS status and the rear axle ABS status remains active before the period of time has elapsed, the method returns to block 318 and the trailer brake control ECU continues to control the trailer brake output circuit in accordance with a trailer brake control ABS mode.

If the front axle ABS status is not determined to be active at block 304 (no at block 304), the method 300 proceeds to block 310, where the trailer brake control ECU is configured to determine if a rear axle ABS status is active. The rear axle ABS status is indicative of whether braking of at least one vehicle wheel (e.g., the second vehicle wheel 103b or the fourth vehicle wheel 103d) coupled to the rear axle (e.g., the second vehicle axle 101b) is being controlled in accordance with a vehicle ABS mode. In some embodiments, the rear axle ABS status is determined to be active in response to determining that the ABS status of the second vehicle wheel 103b is active (which may be determined based on an ABS status of the second vehicle wheel 103b received at the trailer brake control ECU 110 as described above). In some embodiments, the rear axle ABS status is determined to be active in response to determining that the ABS status of the fourth vehicle wheel 103d is active (which may be determined based on an ABS status of the fourth vehicle wheel 103d received at the trailer brake control ECU 110 as described above).

If only one of the front axle ABS status and the rear axle ABS status is active (either yes at block 304 and no at block 306, or no at block 304 and yes at block 310), the method 300 proceeds to block 312 where the trailer brake control ECU is configured to determine whether the axle having an active ABS status remains ABS active for a period of time (which in some embodiments is determined based on vehicle speed). If the axle having an active ABS status remains ABS active for the period of time (yes at block 312), the method 300 proceeds to block 308, where the trailer brake control ECU 110 is configured to control the trailer brake output circuit 118 in accordance with a trailer brake control ABS mode (e.g., as shown in FIG. 5 where the trailer brake control ECU 110 is configured to control the trailer brake output circuit 118 to output a trailer brake output signal based on vehicle deceleration). If the axle having an active ABS status does not remain ABS active for the period of time (no at block 312), the method returns to block 303, where the trailer brake control ECU 110 is configured to control the trailer brake output circuit 118 in accordance with a trailer brake control normal mode (e.g., as shown in FIG. 4). By waiting until the axle having the active ABS status remains ABS active for the period of time, undesirable acceleration loss may be avoided in instances where it may be undesirable to control the trailer brake output circuit 118 in accordance with the trailer brake control ABS mode (e.g., when the towing vehicle is in a step down condition (only 1 axle is likely to be ABS active) or a wheel is encountering a manhole (only 1 wheel and consequently 1 axle is likely to be ABS active)).

The methods of FIGS. 2-3 may facilitate activation of the trailer brakes to maintain stability of the vehicle and trailer and facilitate desirable stopping performance while a towing vehicle wheel is braked in accordance with a vehicle ABS mode in a manner that also prevents unintended acceleration loss.

Referring now to FIG. 4, a trailer brake output curve in which trailer brake output is calculated as a function of master cylinder pressure in a trailer brake control normal mode is depicted. As shown in FIG. 4, in the trailer brake control ABS mode, the trailer brake control ECU is configured to control the trailer brake output circuit 118 to output a trailer brake output signal based on a vehicle deceleration (e.g., vehicle deceleration determined based on the output signal of the accelerometer 132).

Referring now to FIG. 5, a trailer brake output curve in which trailer brake output is calculated as a function of vehicle deceleration in a trailer brake control ABS mode is depicted. As shown in FIG. 5, in the trailer brake control normal mode, the trailer brake control ECU is configured to control the trailer brake output circuit 118 to output a trailer brake output signal based on a vehicle brake pressure (e.g., the master cylinder pressure determined based on the output signal of the MCP sensor 122). In some embodiments, the trailer brake output curve in the trailer brake control ABS mode is nonlinear. In some embodiments, separate trailer brake output curves may be provided in the trailer brake control ABS mode for different trailer brake types (e.g., a first trailer brake output curve for a light trailer with electric trailer brakes, a second trailer brake output curve for a heavy trailer with electric trailer brakes, a third trailer brake output curve for a light trailer with electric-over-hydraulic trailer brakes, and a fourth trailer brake output curve for a heavy trailer with electric-over-hydraulic trailer brakes). In some embodiments, the trailer brake control ECU 110 may be configured to output the greater of a trailer brake output signal commanded as a function of deceleration and a trailer brake output signal commanded as a function of the position of the slider 116 such that a driver may request more trailer brake output than is provided automatically in the trailer brake control ABS mode.

It should now be understood that embodiments described herein provide electronic control units, vehicles, and methods for controlling trailer brake output circuits based on vehicle wheel ABS statuses. By controlling the trailer brake output circuit based on vehicle wheel ABS statuses, trailer brakes may be controlled in accordance with vehicle brakes to maintain stability of the vehicle and trailer and facilitate desirable stopping performance while a towing vehicle wheel is braked in accordance with a vehicle ABS mode. Furthermore, by controlling the trailer brake output circuit based on vehicle wheel ABS statuses, the trailer brakes may be applied in a manner that avoids erroneously activating the trailer brakes in a trailer brake control ABS mode, thereby preventing unintended acceleration loss.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An electronic control unit for controlling a trailer brake output circuit based on vehicle wheel ABS statuses, the electronic control unit configured to:
    determine a first vehicle wheel ABS status, wherein the first vehicle wheel ABS status is indicative of whether braking of a first vehicle wheel is being controlled in accordance with a vehicle ABS mode;
    determine a second vehicle wheel ABS status, wherein the second vehicle wheel ABS status is indicative of whether braking of a second vehicle wheel is being controlled in accordance with the vehicle ABS mode; and
    control the trailer brake output circuit based on the first vehicle wheel ABS status and the second vehicle wheel ABS status, wherein:
        the first vehicle wheel is coupled to a first vehicle axle;
        the second vehicle wheel is coupled to a second vehicle axle; and
        the electronic control unit is further configured to:
        determine that a first vehicle axle ABS status is active in response to determining that the first vehicle wheel ABS status is active, wherein the first vehicle axle ABS status is indicative of whether braking of at least one vehicle wheel coupled to the first vehicle axle is being controlled in accordance with the vehicle ABS mode;
        determine that a second vehicle axle ABS status is active in response to determining that the second vehicle wheel ABS status is active, wherein the second vehicle axle ABS status is indicative of whether braking of at least one vehicle wheel coupled to the second vehicle axle is being controlled in accordance with the vehicle ABS mode; and
        control the trailer brake output circuit based on the first vehicle axle ABS status and the second vehicle axle ABS status.

2. The electronic control unit of claim 1, further configured to control the trailer brake output circuit in accordance with a trailer brake control ABS mode in response to determining that the first vehicle axle ABS status is active and the second vehicle axle ABS status is active.

3. The electronic control unit of claim 1, further configured to, when the first vehicle axle ABS status is active and the second vehicle axle ABS status is inactive, control the trailer brake output circuit in accordance with a trailer brake control ABS mode in response to determining that the first vehicle axle ABS status remains active for a duration of time.

4. The electronic control unit of claim 3, wherein the duration of time is based on a vehicle speed.

5. The electronic control unit of claim 1, further configured to determine, based on the first vehicle wheel ABS status and the second vehicle wheel ABS status, whether to control the trailer brake output circuit in accordance with a trailer brake control ABS mode or to control the trailer brake output circuit in accordance with a trailer brake control normal mode.

6. The electronic control unit of claim 5, wherein
    in the trailer brake control normal mode, the electronic control unit is further configured to control the trailer brake output circuit to output a trailer brake output signal based on a vehicle brake pressure; and
    in the trailer brake control ABS mode, the electronic control unit is further configured to control the trailer brake output circuit to output a trailer brake output signal based on a vehicle deceleration.

7. A vehicle for controlling a trailer brake output circuit based on vehicle wheel ABS statuses, the vehicle comprising:
    a first vehicle wheel coupled to a first vehicle axle;
    a second vehicle wheel coupled to a second vehicle axle;
    the trailer brake output circuit; and
    an electronic control unit configured to:
        determine a first vehicle wheel ABS status, wherein the first vehicle wheel ABS status is indicative of whether braking of the first vehicle wheel is being controlled in accordance with a vehicle ABS mode;
        determine that a first vehicle axle ABS status is active in response to determining that the first vehicle wheel ABS status is active, wherein the first vehicle axle ABS status is indicative of whether braking of at least one vehicle wheel coupled to the first vehicle axle is being controlled in accordance with the vehicle ABS mode;
        determine a second vehicle wheel ABS status, wherein the second vehicle wheel ABS status is indicative of whether braking of the second vehicle wheel is being controlled in accordance with the vehicle ABS mode;
        determine that a second vehicle axle ABS status is active in response to determining that the second vehicle wheel ABS status is active, wherein the second vehicle axle ABS status is indicative of whether braking of at least one vehicle wheel coupled to the second vehicle axle is being controlled in accordance with the vehicle ABS mode; and
        control the trailer brake output circuit based on the first vehicle wheel ABS status the second vehicle wheel ABS status, the first vehicle axle ABS status, and the second vehicle axle ABS status.

8. The vehicle of claim 7, wherein the electronic control unit is further configured to control the trailer brake output circuit in accordance with a trailer brake control ABS mode in response to determining that the first vehicle axle ABS status is active and the second vehicle axle ABS status is active.

9. The vehicle of claim 7, wherein the electronic control unit is further configured to, when the first vehicle axle ABS status is active and the second vehicle axle ABS status is inactive, control the trailer brake output circuit in accordance with a trailer brake control ABS mode in response to determining that the first vehicle axle ABS status remains active for a duration of time.

10. The vehicle of claim 7, wherein the electronic control unit is further configured to determine, based on the first vehicle wheel ABS status and the second vehicle wheel ABS status, whether to control the trailer brake output circuit in accordance with a trailer brake control ABS mode or to control the trailer brake output circuit in accordance with a trailer brake control normal mode.

11. The vehicle of claim 10, wherein
in the trailer brake control normal mode, the electronic control unit is further configured to control the trailer brake output circuit to output a trailer brake output signal based on a vehicle brake pressure; and
in the trailer brake control ABS mode, the electronic control unit is further configured to control the trailer brake output circuit to output a trailer brake output signal based on a vehicle deceleration.

12. A method of controlling a trailer brake output circuit based on vehicle wheel ABS statuses, the method comprising:
determining a first vehicle wheel ABS status, wherein the first vehicle wheel ABS status is indicative of whether braking of a first vehicle wheel is being controlled in accordance with a vehicle ABS mode;
determining a second vehicle wheel ABS status, wherein the second vehicle wheel ABS status is indicative of whether braking of a second vehicle wheel is being controlled in accordance with the vehicle ABS mode; and
controlling the trailer brake output circuit based on the first vehicle wheel ABS status and the second vehicle wheel ABS status,
wherein the first vehicle wheel is coupled to a first vehicle axle and the second vehicle wheel is coupled to a second vehicle axle, the method further comprising:
determining that a first vehicle axle ABS status is active in response to determining that the first vehicle wheel ABS status is active, wherein the first vehicle axle ABS status is indicative of whether braking of at least one vehicle wheel coupled to the first vehicle axle is being controlled in accordance with the vehicle ABS mode;
determining that a second vehicle axle ABS status is active in response to determining that the second vehicle wheel ABS status is active, wherein the second vehicle axle ABS status is indicative of whether braking of at least one vehicle wheel coupled to the second vehicle axle is being controlled in accordance with the vehicle ABS mode; and
controlling the trailer brake output circuit based on the first vehicle axle ABS status and the second vehicle axle ABS status.

13. The method of claim 12, further comprising:
controlling the trailer brake output circuit in accordance with a trailer brake control ABS mode in response to determining that the first vehicle axle ABS status is active and the second vehicle axle ABS status is active.

14. The method of claim 12, further comprising determining whether to control the trailer brake output circuit in accordance with a trailer brake control ABS mode or to control the trailer brake output circuit in accordance with a trailer brake control normal mode based on the first vehicle wheel ABS status and the second vehicle wheel ABS status.

15. The method of claim 14, further comprising:
in the trailer brake control normal mode, controlling the trailer brake output circuit to output a trailer brake output signal based on a vehicle brake pressure; and
in the trailer brake control ABS mode, controlling the trailer brake output circuit to output a trailer brake output signal based on a vehicle deceleration.

* * * * *

UNITED STATES PATENT AND TRADEMARK OFFICE
CERTIFICATE OF CORRECTION

PATENT NO. : 11,097,703 B2
APPLICATION NO. : 15/672472
DATED : August 24, 2021
INVENTOR(S) : Shimizu et al.

Page 1 of 1

It is certified that error appears in the above-identified patent and that said Letters Patent is hereby corrected as shown below:

In the Claims

In Column 14, Line(s) 57, Claim 7, after "status", insert --,--.

Signed and Sealed this
Fourteenth Day of December, 2021

Drew Hirshfeld
*Performing the Functions and Duties of the
Under Secretary of Commerce for Intellectual Property and
Director of the United States Patent and Trademark Office*